No. 615,430. Patented Dec. 6, 1898.
J. CLOUGH & J. BUSH.
VARIABLE SPEED AND POWER MECHANISM FOR MOTOR VEHICLES.
(Application filed Dec. 20, 1897.)
(No Model.) 2 Sheets—Sheet 1.
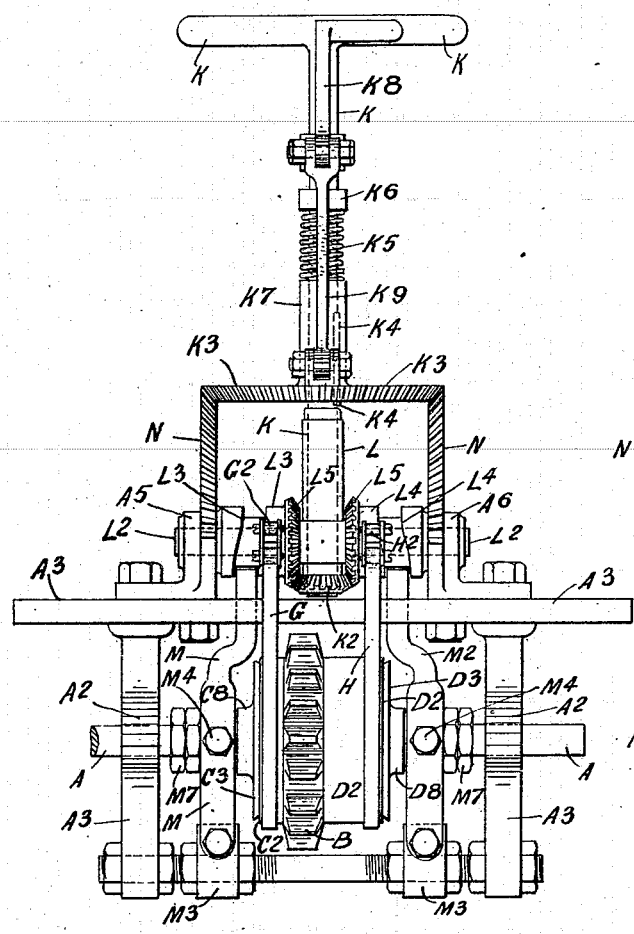
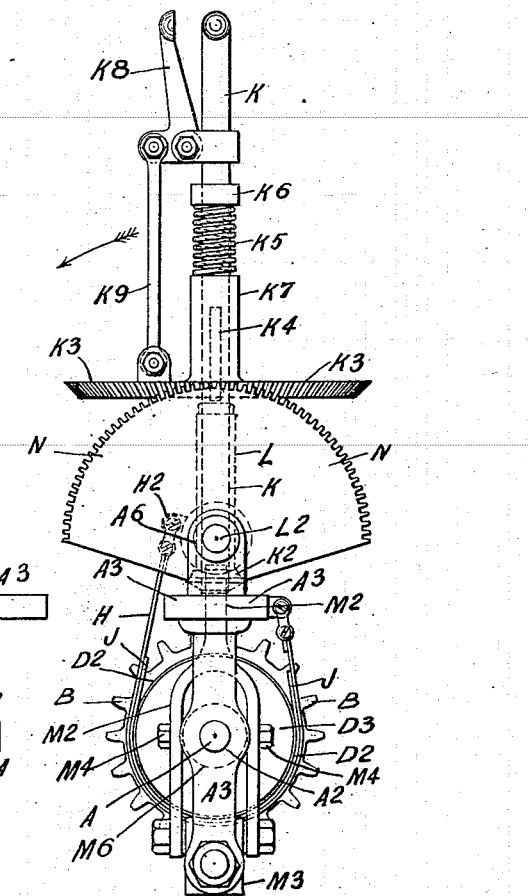
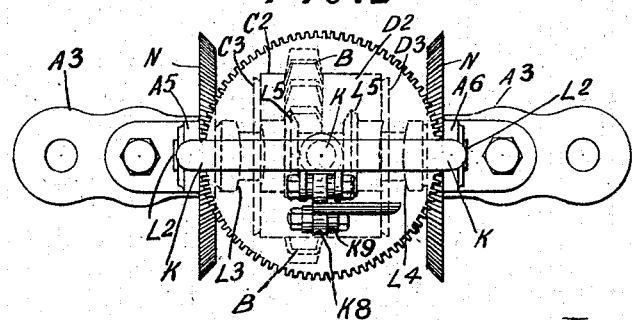
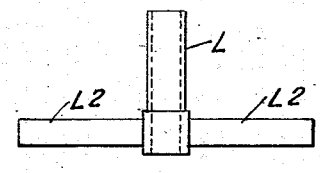
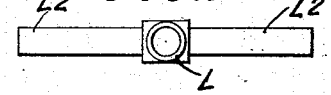
Witnesses:
E. R. Bolton
Inventors:
John Clough
Joseph Bush
By Richards
their Attorneys No. 615,430. Patented Dec. 6, 1898.
J. CLOUGH & J. BUSH.
VARIABLE SPEED AND POWER MECHANISM FOR MOTOR VEHICLES.
(Application filed Dec. 20, 1897.)
(No Model.) 2 Sheets—Sheet 2.
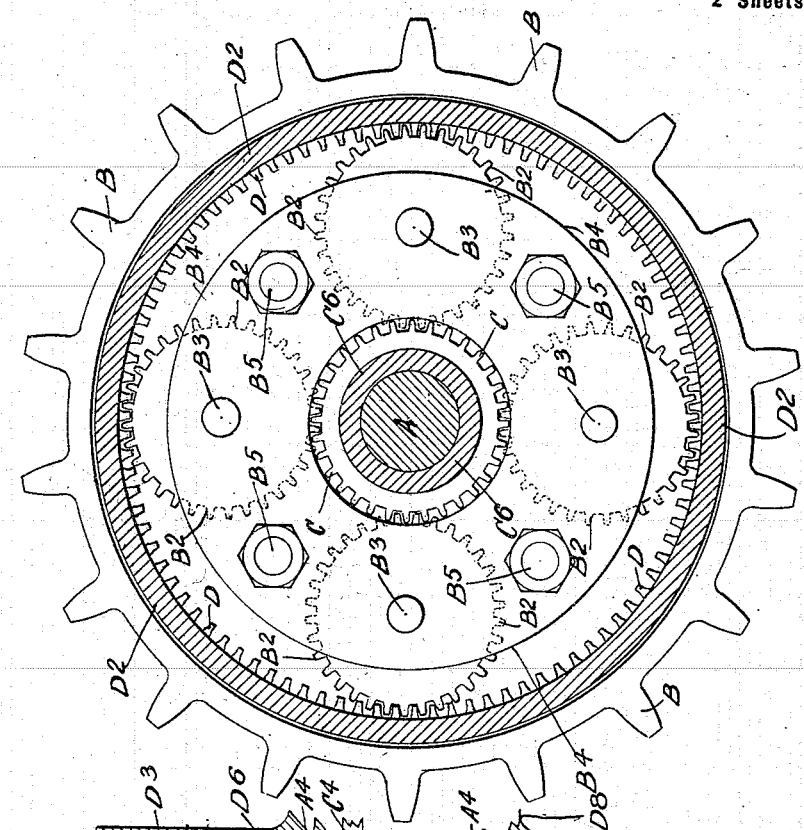
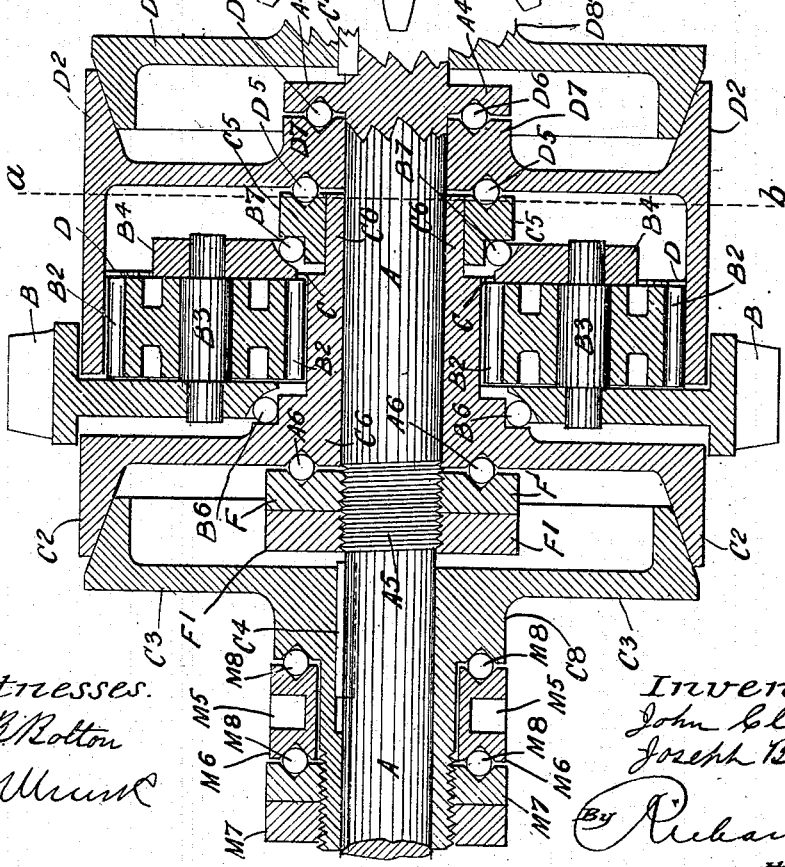
Witnesses. Inventors:
John Clough
Joseph Bush
By Richards
their Attorneys

UNITED STATES PATENT OFFICE.

JOHN CLOUGH, OF BRADFORD, AND JOSEPH BUSH, OF COVENTRY, ENGLAND.

VARIABLE SPEED AND POWER MECHANISM FOR MOTOR-VEHICLES.

SPECIFICATION forming part of Letters Patent No. 615,430, dated December 6, 1898.

Application filed December 20, 1897. Serial No. 662,664. (No model.)

*To all whom it may concern:*

Be it known that we, JOHN CLOUGH, residing at Bradford, and JOSEPH BUSH, residing at Coventry, England, subjects of the Queen of England, have invented certain new and useful Improvements in Variable Speed and Power Mechanism for Autocarriages or Motor-Vehicles, of which the following is a specification.

This invention has been patented in the following countries: England, No. 2,891, dated February 8, 1896, and No. 19,014, dated August 28, 1896; France, No. 261,393, dated November 18, 1896; Belgium, No. 124,644, dated November 18, 1896; Italy, XXXII, 43,058, LXXXIV, 278, dated December 14, 1896; Switzerland, No. 13,372, dated November 18, 1896; Hungary, No. 7,806, dated November 19, 1896; Austria, No. 47/1,368, dated November 18, 1896, and Germany, No. 65,782, dated November 19, 1896.

This invention relates to improvements in autocarriages or vehicles fitted with driving-motors; and its object is to provide compact and conveniently-controllable mechanism for varying the speed of the vehicle in relation to that of the motor.

In the accompanying drawings, Figure 1 represents an elevation of the mechanism constituting our invention. Fig. 2 represents a plan view, and Fig. 3 a side view, of the same. Fig. 4 represents a diametrical section, on a larger scale, of part of the mechanism; and Fig. 5 represents a cross-section of the same on the broken line $a\,b$, Fig. 4. Figs. 6 and 7 are separate views of a detail hereinafter referred to.

The shaft A is mounted in bearings $A^2$, formed in the framework $A^3$, which is fixed to or forms part of the framework of the vehicle. The shaft A is positively driven in any convenient manner from the motor, and the motion of the shaft A is transmitted by the mechanism hereinafter described to the chain or sprocket wheel B, which drives the driving-shaft or driving wheel or wheels of the vehicle, by means of a chain or its equivalent.

The mechanism above referred to consists, first, of a sun-wheel C, capable of being clutched to and revolve with the shaft A or to be held stationary, and, second, of an annular or internally-toothed wheel D, also capable of being clutched to and revolve with the shaft A or to be held stationary, and also, third, of a planet-wheel or planet-wheels $B^2$, fixed to the chain-wheel B and engaging both the sun-wheel C and the annular wheel D. In this arrangement three speeds of the chain-wheel in relation to that of the motor are obtainable, namely: First, when both the sun-wheel C and the annular wheel D revolve with the shaft A the chain-wheel B is driven at the same speed as the shaft A; second, when the sun-wheel is held stationary while the annular wheel D is driven with the shaft A the chain-wheel B is driven at a reduced speed in relation to the shaft A; third, when the annular wheel D is held stationary and the sun-wheel is driven at the same speed as the shaft A the chain-wheel B is driven at a still more reduced speed in relation to the shaft A.

The sun-wheel C is loosely mounted upon the shaft A and is provided with a cone-shell $C^2$ to engage the cone-clutch $C^3$, mounted upon the shaft A and keyed to it by the key $C^4$, so as to revolve with it, but be free to be moved longitudinally upon the shaft to engage or disengage it from the shell $C^2$.

The annular wheel D is also provided with a cone-shell $D^2$ to engage the cone $D^3$, mounted in a similar way to the cone $C^3$ upon the shaft A. The wheel D is mounted upon ball-bearings $D^5$ and $D^6$, lying in ball-races formed in the central boss $D^7$ of the wheel D, and the collar $A^4$, formed upon the shaft A, and also a loose collar $C^5$, (omitted in Fig. 5,) fitting upon the boss $C^6$ of the sun-wheel C.

The planet-wheels $B^2$ are mounted upon pins $B^3$, fixed in the face of the chain-wheel B and also in the annular support $B^4$, rigidly secured to the wheel B by the studs $B^5$. The wheel B and the annular support $B^4$ revolve upon the balls $B^6$ and $B^7$, respectively lying in the ball-races formed around the collar $C^5$ and the boss $C^6$, formed between the shell $C^2$ and the sun-wheel C.

The whole of the ball-bearings above described are adjusted by the screw-nut F and the lock-nut F', fitting the screw-thread $A^5$, cut upon A. Balls $A^6$ are interposed between the nut F and the face of the shell $C^2$ to reduce the friction.

It will be readily understood that by means of the cones $C^3$ and $D^3$ the sun-wheel C and the annular wheel D may be clutched fast, so as to revolve with the shaft A, or that either the sun-wheel or the annular wheel, or both of them, may be disengaged from the shaft A. We provide band-clutches G and H to bear upon the outer peripheries of the shells $C^2$ and $D^2$ to hold them stationary when the cones $C^3$ and $D^3$ are disengaged therefrom. These band-clutches are preferably lined with leather J, and one end of each band is fixed to the framework $A^3$, while the other ends are each connected to a lever or its equivalent, by which the bands may be tightened to hold the parts they embrace stationary or be slackened when such parts are required to revolve.

In order to avoid complication in working and to simplify the manipulation of the several clutches, we arrange them so that they are all controlled by one regulating-lever K. This lever is mounted in the hollow projection L, formed upon the shaft $L^2$, (separately shown in Figs. 6 and 7,) and the bevel-wheel $K^2$ is rigidly fixed upon the lower end of the lever K, which projects through L. The shaft $L^2$ is mounted in bearings $A^5$ and $A^6$, fixed to the frame $A^3$. Cams $L^3$ and $L^4$ are loosely mounted upon the shaft $L^2$, which cams engage the upper ends of the clutch-levers M and $M^2$, pivoted to the adjustable blocks $M^3$, fixed upon the lower part of the frame $A^3$. The levers M and $M^2$ are provided with screw-pins $M^4$, which engage holes $M^5$, formed in the collars $M^6$, loosely mounted upon the bosses $C^8$ and $D^8$ of the clutch-cones $C^3$ and $D^3$, but confined longitudinally thereon by the screw-nuts $M^7$. Balls $M^8$ are placed on each side of the collars $M^6$ to reduce the friction. The cams $L^3$ and $L^4$ have bevel-teeth $L^5$ formed around their inner faces, which teeth engage the teeth of the bevel-wheel $K^2$. Consequently if the lever K is moved forward in the direction of the arrow, Fig. 3, both the cams $L^3$ and $L^4$ are partly turned with the shaft $L^2$, and the cams are so formed that such a movement moves the clutch-levers M and $M^2$ toward each other, which forces the clutch-cones $C^3$ and $D^3$ into the shells $C^2$ and $D^2$ and locks both the sun-wheel C and the annular wheel D to the shaft A. Also, as the ends of the band-clutches G and H are fixed to the peripheries of the cams $L^3$ and $L^4$ by the links $G^2$ and $H^2$ this same movement of the cams slackens the bands and leaves the parts they embrace free to revolve with the shaft A. If, however, instead of moving the lever K forward it is partly turned on its axis, one of the cams is turned in one direction and the other in the other direction. This has the effect of engaging one of the clutch-cones with its cone-shell and disengaging the other and at the same time the band-clutch around the engaged cone is slackened while the other one is tightened. It is obvious that turning the lever K in the reverse direction will disengage the cone previously engaged and engage the other one and also slacken the tight band-clutch and tighten the other one.

To lock the lever K in any position, a toothed quadrant N is fixed on each side of the bearing-pieces $A^5$ and $A^6$, and the circular rack $K^3$ to engage these quadrant-pieces is provided on the lever K. The rack $K^3$ is prevented from rotating on the lever K by the key $K^4$; but it is free to be moved up the lever to disengage it from the quadrants N while the lever is adjusted. The spring $K^5$, confined between the collar $K^6$ upon K and the central boss $K^7$ on the rack $K^3$, normally keeps the rack down to engage with the quadrants. A small lever $K^8$, pivoted to K and connected by the rod $K^9$ to the rack $K^3$, is provided to enable the rack to be lifted by the hand used to hold and adjust the lever K. Any other form of friction-clutch may be employed instead of the cones and band-clutches shown.

When the lever K is just sufficiently forward to slacken the band-clutches without engaging the cones, the sprocket-wheel B is free to overrun the shaft A. On the other hand, if the lever K is moved in the opposite direction to the arrow, Fig. 3, the band-clutches are thereby tightened around the cone-shells and act as a brake.

We claim—

1. In combination, the driving-shaft, the sun gear-wheel journaled thereon, the gear-ring also journaled thereon, the driven member loose on said shaft, the planet gear-wheels journaled to said driven member and engaging both the sun-wheel and gear-ring, means for clutching the gear-ring to the shaft, means for clutching the sun-wheel to the shaft, braking means for holding the sun-wheel against movement and braking means for holding the gear-ring against movement, substantially as described.

2. In combination, the shaft, the sun gear-wheel journaled thereon and having a friction clutch-surface, the gear-ring also journaled on said shaft and having a friction clutch-surface, the driven element journaled on the shaft, planet-gears carried thereby engaging the ring and sun gear, friction-clutches adapted to engage either or both of the friction-surfaces carried by the sun-wheel and gear-ring, and braking devices for holding either the sun-gear or gear-ring stationary, substantially as described.

3. In combination, the shaft, the sun-gear and gear-ring journaled thereon, the driven element journaled on the shaft, planet-gears carried thereby and engaging both the sun-gear and gear-ring, braking-surfaces carried by the said sun-gear and gear-ring, means for clutching one or both said parts to the shaft, brake-straps engaging said braking-surfaces and connections for operating the clutches and brake-straps from a single lever, substantially as described.

4. In combination, the driving-shaft, the sun-gear and gear-ring journaled thereon, and having clutch and braking surfaces, the driven element also journaled on said shaft, planet-gears carried thereby engaging the sun-gear and gear-ring, clutches for engaging said clutch-surfaces, brakes to operate on said brake-surfaces, lever-arms engaging the clutches, a rock-shaft, cams carried thereby adapted to cause one or both to engage the clutch-surfaces, mechanism carried by said shaft for alternately operating the brakes, and means for operating said rock-shaft, substantially as described.

In testimony whereof we have hereunto set our hands in the presence of the two subscribing witnesses.

JOHN CLOUGH.
JOSEPH BUSH.

Witnesses:
 ALBERT BROWN,
 ERNEST OVERTON.